Oct. 9, 1923. Re. 15,696
R. E. WILDER
TRUCK FRAME
Original Filed April 25, 1918
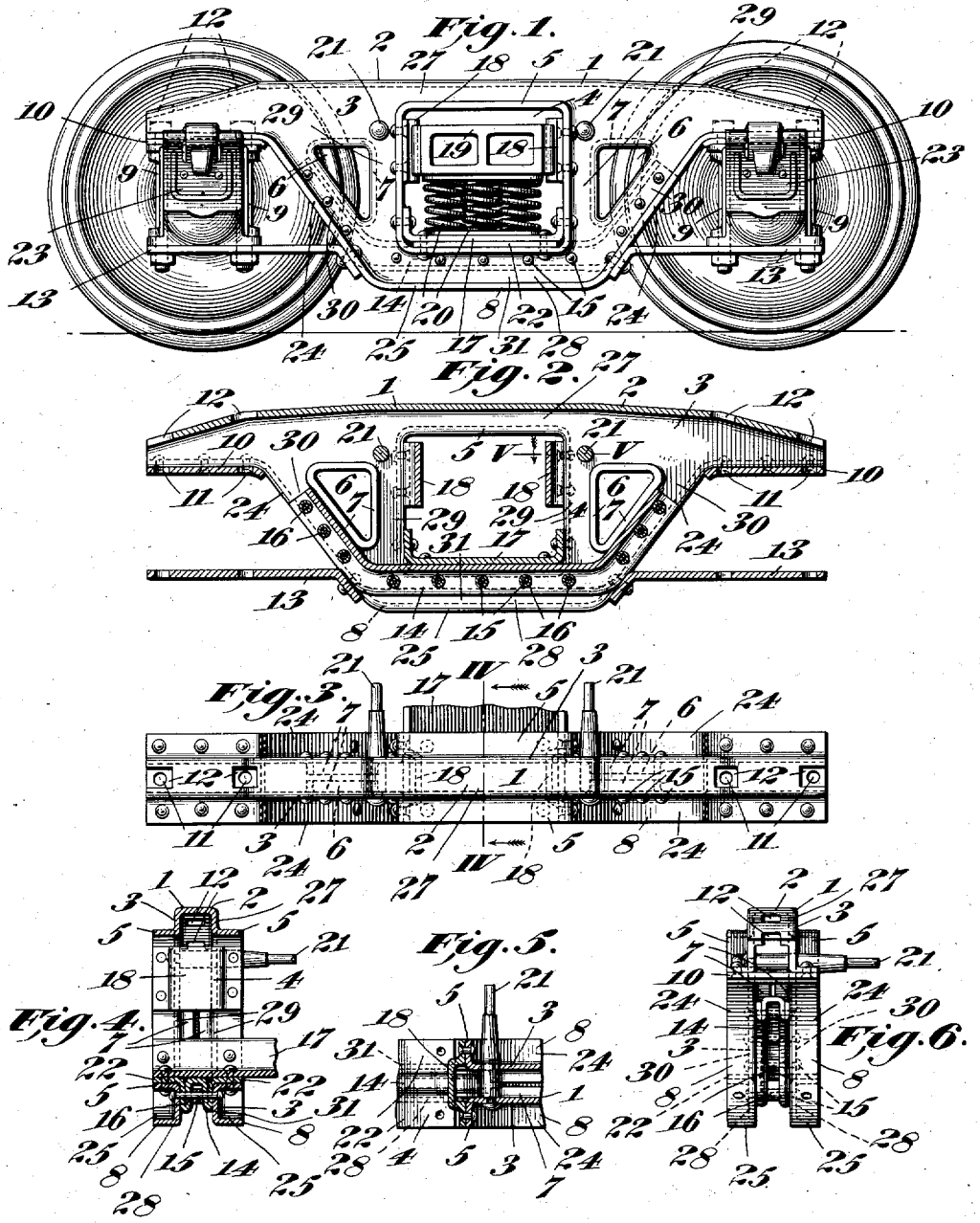
Inventor
Ralph E. Wilder
By A. B. Reavis
Attorney Reissued Oct. 9, 1923. Re. 15,696

UNITED STATES PATENT OFFICE.

RALPH E. WILDER, OF BETHLEHEM, PENNSYLVANIA, ASSIGNOR, BY MESNE ASSIGNMENTS, TO BETHLEHEM STEEL COMPANY, A CORPORATION OF PENNSYLVANIA.

TRUCK FRAME.

Original No. 1,270,908, dated July 2, 1918, Serial No. 230,829, filed April 25, 1918. Application for reissue filed August 18, 1923. Serial No. 658,170.

*To all whom it may concern:*

Be it known that I, RALPH E. WILDER, a citizen of the United States, and a resident of Bethlehem, in the county of Northampton and State of Pennsylvania, have made a certain new and useful Invention in Truck Frames, of which the following is a specification.

My invention relates to trucks for railway cars and particularly to those for freight cars and to that portion known as the side frame and its appurtenances. My truck frame consists essentially of an integral metal plate, formed with the upright portions spaced apart; the top member being integral and the side members bent downwardly therefrom; the end members projecting longitudinally of the frame and provided with bearing surfaces adapted to rest on the tops of the journal boxes; the ends of the side portions extending downwardly and inwardly inclined from the tops of the journal box bearing portions; the bottom portion being substantially horizontal, the whole being provided with openings centrally arranged, of substantially rectangular form to receive the end of the bolster; the lower portion of the opening being provided with a spring seat, and the sides of the opening being provided with bolster guides. The two upright web portions, which are spaced apart, are secured together by means of a bent plate, the flanges of which are riveted near the lower portions of the side members and preferably also to the inclined portions of the side members. I also provide two triangular openings with rounded corners in each side portion, having internally projecting integral stiffening flanges around them. The structural portion of my truck side frame is thus practically composed of one sheet or plate of metal, which is formed or folded together at its upper portion, the downwardly projecting side members being spaced apart and the lower portions secured together by a bent plate secured to both.

Having thus given a general description of my invention, I will now, in order to make the matter more clear, refer to the annexed sheet of drawings which form part of this specification and in which like characters refer to like parts.

Figure 1 is a side elevation of a railway car truck provided with a side frame embodying my invention;

Figure 2 is a vertical longitudinal sectional elevation;

Figure 3 is a top plan view;

Figure 4 is a vertical transverse sectional elevation taken on the line IV—IV of Figure 3;

Figure 5 is a sectional elevation taken on the line V—V of Figure 2; and

Figure 6 is an end elevation.

Referring now to the characters of reference on the drawings:—1 is the side frame in general, 2 is the upper portion or top flange, 3 are the sides or webs which are substantially upright, spaced apart and substantially parallel to each other, 4 is the central opening of substantially rectangular outline with rounded corners, the edges of the plate adjacent the opening being provided with integral outwardly extending flanges 5. The webs are further provided with triangular openings 6 with rounded corners, these being provided with inwardly extending flanges 7 formed integral with the web portions. The entire lower portions and inclined side portions of the frame are provided with integral outwardly extending flanges 8. As shown, there are two side plates 3 formed integrally with the top flange 2 and extending downwardly therefrom and substantially parallel to each other, and the lower portion of the truck frame and the inclined side portions are secured together by means of the bent plate 14, the flanges of which adjoin and are riveted to the webs 3 as illustrated, by means of the rivets 15. The rivets 15 are preferably through rivets and are provided with sleeves or thimbles 16 between the flanges to resist the compression when driving and to further stiffen the structure when the rivets are driven. The plate 14 is formed, as shown, with flanges by doubling or folding the plate, and the intermediate part of the outwardly extending portions 22 rests upon the upper surfaces of the flanges 5 and assists in forming the spring seat as illustrated. The portions 22 are of slightly less length than that of the bolster opening as shown. The spring plank 17, which is of channel form, is secured, as illustrated, and riveted through the flanges 5 and the extending portions 22 as shown. Column guides 18 are secured to the flanges 5, these column guides being formed of pressed plates, as illustrated. The bolster is 19, the springs 20, the brake hanger carriers are 21, the outwardly extending portions of the bent plate are 22, and journal boxes 23 of the usual type are used. Bearing plates 10 are secured to the laterally projecting ends of the truck frame to form seats to bear upon the tops of the journal boxes. Holes 11 are provided in the journal bearing plate 10, and other openings 12 are provided near the ends of the upper flange member 2 through which the journal box bolts 9 may be passed for securing the journal boxes to the truck frame. The usual pedestal tie bar 13 is shown as riveted to the truck frame and secured to the lower portions of the journal boxes by means of the journal box bolts.

From the foregoing, it will be apparent that I provide a truck side frame, the main or body portion of which is constructed from an integral metal plate folded at the top, as indicated at 2, to provide downwardly-extending and substantially parallel side webs 3 having converging and downwardly-extending side edges 24 which join intermediate bottom edges 25. The rectangular flanged openings 4 are arranged above the bottom edges 25 and the triangular openings 6 are arranged above the inclined or converging edges 24. This construction provides for an upper arch or compression member 27, a lower arch or tension member 28, and connecting column members 29, the members being separated and defined by the openings 4 and 6. The upper member 27 projects over the journal boxes 23 and it is integral with the upper ends of the column members 29 and with the upper ends of the inclined side portions 30 of the lower member 28. The lower member 28 is integral with the lower ends of the column members 29 and includes a horizontal or bottom portion 31 arranged between the inclined side portions 30. The upper member consists of the bent over or folded portion, indicated at 2, portions of the webs 3 including the top flanges of the openings 4 and 6, and the horizontal ends of the lower web flanges 8. The column members 29 comprise opposed portions of the web and flanges of adjacent sides of the triangular and rectangular openings 6 and 4. The lower member 28, comprised by the inclined side portions 30 and by the bottom portions 31, includes opposed portions of the webs 3, adjacent flanges of the openings 4 and 6, and the lower marginal web flanges 8 between the horizontal end portions of the latter. As heretofore stated, the lower member also includes a bent plate 14, which is riveted thereto.

Although I have described and illustrated my invention in considerable detail, I do not wish to be limited to the exact and specific details thereof as shown and described, but may use such modifications in, substitutions for, or equivalents thereof, as are embraced within the scope of my invention or as pointed out in the claims.

Having thus described my invention, what I claim and desire to secure by Letters Patent is:—

1. In a truck frame an integral plate forming the top, side and bottom members, the sides of which extend substantially parallel and downwardly from the upper member.

2. In a truck frame an integral metal plate composing the top, side, and bottom members, the top member having longitudinal extensions, the bottom and sides being provided with integral outwardly extending flanges, bearing plates secured to the longitudinal extensions, and a bent plate secured between and to the lower portions of the side members.

3. In a truck frame an integral metal plate composing the main members, the sides being bent downwardly from the upper portion of the top member, longitudinally extending end portions forming journal bearing portions, and bolster openings in the side members provided with outwardly extending flanges around the edges thereof.

4. In a truck frame a main member comprising an integral plate forming the top and bottom members and the sides and provided with longitudinal extensions forming journal bearing portions, integral outwardly extending flanges on the side and bottom portions, and a bent plate with flanges adjacent and secured thereto.

5. In a truck frame an integral metal plate comprising the main structure, provided with longitudinal extending portions forming journal bearings, the side portions being bent downwardly from and extending substantially parallel below the upper portion, the lower portions being provided with externally projecting flanges, bolster openings at the central portion of said side frame provided with integral outwardly projecting flanges surrounding the same, triangular openings adjacent to said central opening, the margins of which are provided with integral inward projections.

6. In a truck frame an integral metal plate comprising the main members composing the upper portion, side portions bent downwardly and extending substantially parallel below the same, substantially horizontal lower portions, inclined side portions, outwardly extending flanges on the lower portions of said frame, the longitudinal extending portion being provided with bearing plates secured to the flanges thereof.

7. In a truck frame an integral metal plate comprising the main members composing an upper portion, side portions bent downwardly and extending substantially parallel below the same, substantially horizontal lower portions, inclined side portions, longitudinally extending end portions, outwardly extending flanges on the lower sides of said frame, the longitudinal extending flanges being provided with bearing plates secured to the flanges thereof, and a bent plate, the flanges of which adjoin and are secured to the lower parts of said side portions.

8. A side frame, the main members of which are formed of a single integral plate comprising a top portion, side portions bent downwardly therefrom, spaced apart and substantially parallel, the lower portions being provided with outwardly projecting flanges, a bent plate provided with flanges adjoining the lower part of the side portions and secured thereto, longitudinal extending upper portions provided with bearing plates secured to the outwardly projecting flanges thereof and adapted to form journal bearings.

9. In a truck frame having upper and lower members, the lower member including inclined side portions and a bottom portion, and consisting of an integral plate folded at the top to provide downwardly-extending substantially parallel side webs, said webs having openings therein which separate and define the upper member and the lower member including the inclined side portions and the bottom portion of the latter.

10. In a truck frame having upper and lower members, the lower member including inclined side and bottom portions, and consisting of an integral plate folded at the top to provide downwardly-extending substantially parallel side webs, each web having downwardly-converging side edges and a bottom edge, and the webs having openings therein which separate and define the upper and lower members.

11. In a truck frame having upper and lower members, the lower member including inclined side and bottom portions, and consisting of an integral plate folded at the top to provide downwardly-extending substantially parallel side webs, each web having downwardly converging flanged side edges and a flanged bottom edge, and said webs having a plurality of flanged openings which separate and define the upper and lower members.

12. A truck side frame consisting of a plate folded at the top to provide downwardly-extending side webs, each web having horizontal lower sides at the ends merging into inclined and converging sides which merge into a horizontal side, the webs being provided with aligned and substantially rectangular openings above the horizontal sides and the openings having surrounding flanges.

13. A truck side frame consisting of an integral plate folded at the top to provide downwardly-extending side webs, each web having horizontal lower sides at the ends, merging into inclined and converging flanged lower sides, the latter merging into a horizontal flanged bottom side, said webs being provided with aligned and flanged substantially rectangular openings above the bottom flanged lower side and with aligned flanged triangular openings above the inclined flanged lower sides.

14. A truck side frame having an upper or compression member and a lower or tension member and consisting of a plate folded at the top to provide downwardly-extending side webs, said webs having flange-surrounded openings which separate and define the upper and lower members, the upper member including the folded portion and the lower member consisting of inclined and bottom portions including opposed portions of the webs below the openings.

15. A truck frame having an upper member terminating in bearing portions for journal boxes and a lower member and consisting of a plate folded at the top to provide downwardly-extending and substantially parallel side webs having lower marginal and transversely extending flanges, said webs having flange-surrounded openings which separate and define the upper and lower members, the upper member including the folded portion and the lower member including opposed portions of said side webs below the openings.

16. A truck side frame having upper, lower and column members and consisting of an integral plate folded at the top to provide downwardly-extending and substantially parallel side webs, the upper portions of said webs including the folded portion constituting the upper member, said webs including opposed portions continuous with the upper member and constituting the column members and including opposed portions continuous with the upper member and with the column members and constituting the lower member.

17. A truck side frame having upper, lower, and column members and consisting of a plate folded at the top to provide downwardly-extending webs, each web having lower horizontal flanged sides at the ends merging into inclined flanged lower sides which merge into a horizontal flanged lower side, the webs being provided with aligned and substantially rectangular flanged openings above the horizontal flanged lower sides and with flanged triangular openings disposed laterally of the rectangular openings and above the inclined flanged lower sides.

18. A truck side frame having upper, lower, and column members and consisting of a plate folded at the top to provide downwardly-extending webs, each web having lower horizontal sides at the ends thereof merging into inclined lower sides which merge into a horizontal lower side, the webs being provided with aligned substantially rectangular openings above the horizontal lower sides and with aligned triangular openings disposed laterally of the rectangular openings, each triangular opening having a side disposed adjacent to and extending in the same general direction as an inclined lower side.

19. A truck side frame having upper, lower, and column members, the lower member including inclined side and bottom portions, and consisting of a plate folded at the top and having downwardly-extending side webs, the side webs having centrally disposed, aligned and similar substantially rectangular openings and having aligned and similar triangular openings at the sides of the rectangular openings, the material of the webs above the openings and including the folded portion constituting the upper member, opposed portions of the webs between the rectangular and the triangular openings constituting the column members, and opposed portions of the webs below the openings constituting the side and bottom portions of the lower member.

In testimony whereof I hereunto affix my signature this 9th day of August, 1923.

RALPH E. WILDER.